United States Patent [19]
Jäger

[11] Patent Number: 5,202,436
[45] Date of Patent: Apr. 13, 1993

[54] TRIPHENDIOXAZINE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 666,092

[22] Filed: Mar. 7, 1991

[30] Foreign Application Priority Data

Mar. 30, 1990 [DE] Fed. Rep. of Germany ....... 4010223

[51] Int. Cl.$^5$ ............... C09B 19/00; C09B 62/04
[52] U.S. Cl. ........................... 544/76; 544/77; 534/567; 534/605; 534/612; 534/617; 534/635
[58] Field of Search ............ 544/76, 77; 534/617, 534/635, 567, 605, 612

[56] References Cited

U.S. PATENT DOCUMENTS

| | | | |
|---|---|---|---|
| 4,604,459 | 8/1986 | Jager | 544/76 |
| 4,785,099 | 11/1988 | Springer et al. | 544/76 |
| 4,885,360 | 12/1989 | Scheibli | 544/77 |
| 5,122,605 | 6/1992 | Pedrazzi | 544/76 |

FOREIGN PATENT DOCUMENTS 1477071 6/1977 United Kingdom .
2228738 9/1990 United Kingdom .

Primary Examiner—Mukund J. Shah
Assistant Examiner—Philip I. Datlow
Attorney, Agent, or Firm—Sprung Horn Kramer & Woods

[57] ABSTRACT

The new triphendioxazine dyestuffs of the formula

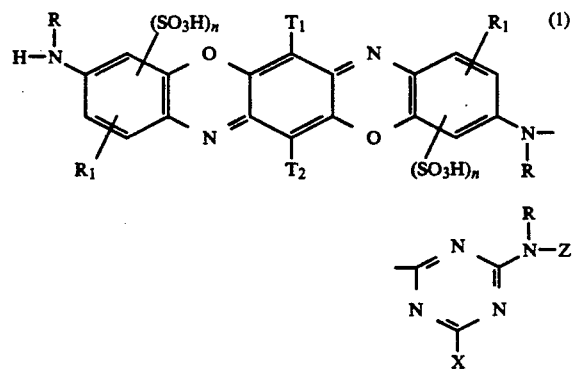

in which the substituents have the meaning given in the description are suitable for the dyeing and printing of cellulose-containing and amido-containing materials.

1 Claim, No Drawings

TRIPHENDIOXAZINE DYESTUFFS

The invention relates to new triphendioxazine dyestuffs, to processes for their preparation and to their use for the dyeing and printing of cellulose-containing and amido-containing materials.

A general definition of the new triphendioxazine dyestuffs is given by the formula

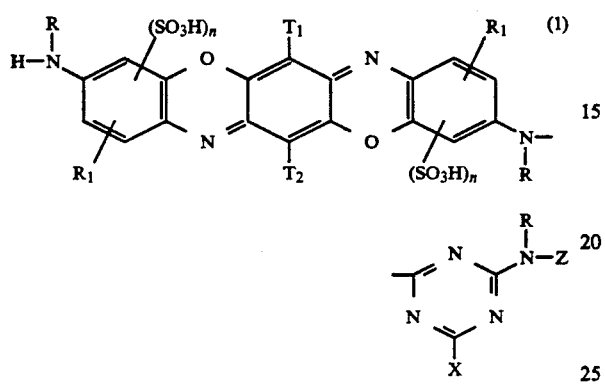

in which
R represents hydrogen or substituted or unsubstituted $C_1$-$C_6$-alkyl,
$R_1$ represents hydrogen or a substituent,
$T_1$ and $T_2$ each represent hydrogen, chlorine, bromine, substituted or unsubstituted $C_1$-$C_4$-alkyl, substituted or unsubstituted $C_1$-$C_4$-alkoxy, substituted or unsubstituted phenyl or substituted or unsubstituted phenoxy,
X represents a detachable radical, such as, for example, fluorine, chlorine, bromine, sulpho, methylsulphonyl, ethylsulphonyl or pyridyl which is unsubstituted or substituted by sulpho, carboxyl, sulphamoyl or carbamoyl,
Z represents $Z_1$, $Z_2$, $Z_3$, $Z_4$ or $Z_5$, in which
$Z_1$ represents the grouping

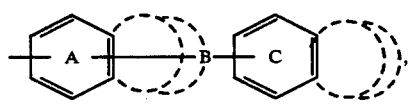

in which
A represents a substituted or unsubstituted phenylene or naphthylene radical, and
C represents a substituted or unsubstituted phenyl- or naphthyl radical,
and
B represents a direct bond or a bridging member;
$Z_2$ represents

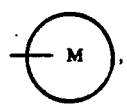

in which
M represents the radical of a heterocyclic ring system containing at least two fused 5- and/or 6-membered rings, preferably one of the following radicals:

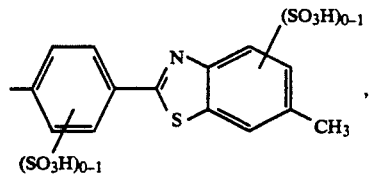

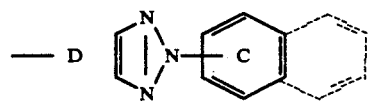

or

in which
C has the abovementioned meaning,
D and E each represent the radical of a substituted or unsubstituted phenylene or naphthylene ring, and
G represents the radical of a substituted or unsubstituted benzene or naphthaline ring;
$Z_3$ represents the grouping

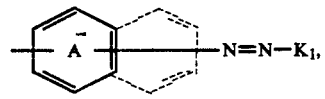

in which
$K_1$ represents the radical of a coupling component of the pyridone, pyrazolone or acetoacetylarylide series, and
A has the abovementioned meaning;
$Z_4$ represents the grouping

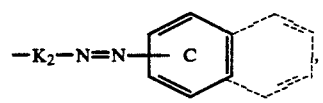

in which
$K_2$ represents the radical of a coupling component of the pyridone, pyrazolone or acetoacetylarylide series, and
C has the abovementioned meaning;
$Z_5$ represents

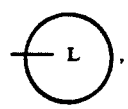

in which
L represents the radical of an aromatic hydrocarbon containing at least three fused rings;
n represents 0 or 1, with the proviso that, if n is 1, the sulpho groups are in each case in the ortho-position relative to the substituents

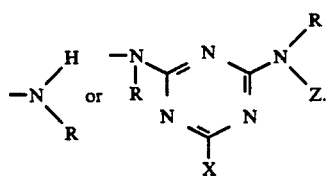

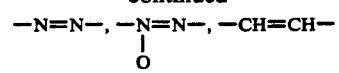

In the context of the formula (1), preferred dyestuffs have the formula

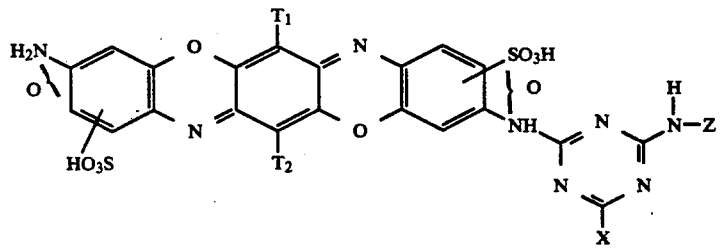

(2)

The radicals R, $R_1$, $T_1$ and $T_2$ can be identical or different. Substituents of the substituted substituents of the $C_1$-$C_4$-alkyl and $C_1$-$C_4$-alkoxy radicals $T_1$ and $T_2$, if substituted, are, for example, $C_1$-$C_4$-alkyl or -$SO_3H$.

Substituents of the phenyl and phenoxy radicals $T_1$ and $T_2$, if substituted, are, for example, chlorine, bromine, $C_1$-$C_4$-alkyl or -$SO_3H$.

Examples of suitable substituents $R_1$ are as follows: halogen, such as, for example, chlorine, $C_1$-$C_4$-alkyl, $C_1$-$C_4$-alkoxy, —COOH.

The radical Z preferably contains 1 to 4 water-solubilising groups, in particular a sulpho and/or carboxyl group. Further water-solubilising groups are the sulphato or disulphimido group.

Examples of substituents of rings A, C, D, E, G, L and M are: halogen atoms, such as fluorine, chlorine or bromine, $C_1$-$C_4$-alkyl, $C_1$-$C_4$-alkoxy, nitro, sulpho, carboxyl, hydroxyl, $C_1$-$C_4$-alkylcarbonylamino, unsubstituted or chlorine-, methoxy-, methyl-substituted phenylcarbonylamino, phenylureido, ureido. Ring C can also be substituted in particular by phenyl and naphthylazo groups.

Examples of bridging members B are:

—N—C—, —C—N—, —SO₂—N—, —N—SO₂—, —C—,
 |  ‖    ‖  |        |        |          ‖
 H  O    O  H        H        H          O

—SO₂—, —S—, —O—, —N—, —N—, —N—C—N—,
                  |     |     |  ‖  |
                  H    CH₃    H  O  H

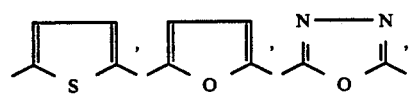

Furthermore, those dyestuffs of the formula (1) or (2) are preferred in which
$T_1$ and $T_2$ each represent chlorine or methoxy and
X represents fluorine, chlorine or sulpho.

The new triphendioxazine dyestuffs of the formula (1) can be prepared by either a) reacting 1 mol of a triphendioxazine dyestuff of the formula

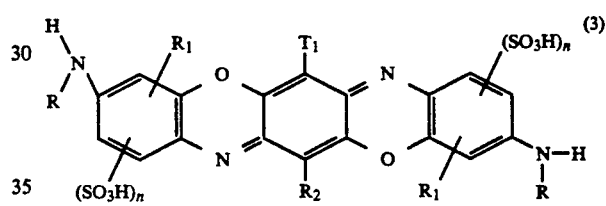

(3)

in which R, $R_1$, $T_1$, $T_2$ and n have the abovementioned meaning, with one mol of a halogenotriazine of the formula

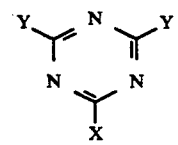

(4)

in which
Y represents fluorine, chlorine or bromine and
X has the abovementioned meaning, preferably represents halogen,
to give a monoacylation product of the formula

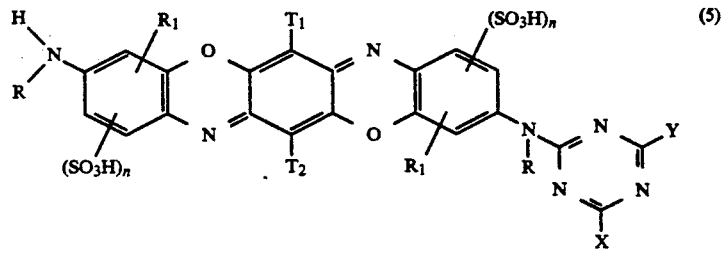

(5)

in which
R, $R_1$, $T_1$, $T_2$, X and n have the abovementioned meaning and
Y represents fluorine, chlorine or bromine, and then condensing this product with one mol of an amine of the formula

  (6)

in which R and Z have the abovementioned meaning, or b) reacting one mol of an amine of the formula (6) with one mol of halogenotriazine of the formula (4) to give a halogenotriazine of the formula

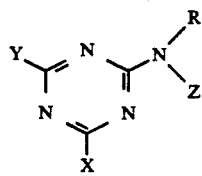  (7)

in which R, X, Y and Z have the abovementioned meaning, and then condensing this product with one mol of a triphendioxazine dyestuff of the formula (3). If the substituent X in the triphendioxazine dyestuffs of the formula (1) represents halogen, it can be replaced in an exchange reaction by a different detachable group, such as defined under the meaning of X.

The condensation of the dyestuffs (3) or the amines (6) with the halogenotriazines (4) is preferably carried out in aqueous or aqueous-organic medium and, depending on the reactivity of the halogenotriazine, at temperatures of 0° C. to 40° C., the hydrohalic acid liberated during the condensation being, if desired, trapped by the addition of acid-binding agents.

The further condensation of the monoacylation products (5) or (7) with an amine (6) or a dyestuff (3) is likewise carried out in aqueous or aqueous-organic medium at temperatures of 20° C. to 100° C., the hydrogen halide liberated during the condensation being neutralised by the addition of acid-binding agents. Acid-binding agents are in particular the bicarbonates, carbonates, hydroxides, phosphates or borates of alkali metals and alkaline earth metals.

The exchange of the substituent X representing halogen in dyestuffs of the formula (1) for other detachable groups is likewise carried out in aqueous or aqueous-organic medium at temperatures of 60° C. to 100° C., the hydrogen halide liberated during the condensation being neutralised by the addition of acid-binding agents.

A preferred method of preparation consists in condensing dyestuffs (3) with cyanuric chloride to give dyestuffs (5) where X is chlorine and then exchanging the chlorine atom for a radical —NRZ.

For the condensation reactions, the triphendioxazine dyestuffs (3) are preferably used in the form of their neutral alkali metal salts, in particular their lithium salts.

Dyestuffs of the formula (3) are known from the literature. Thus, for example, their preparation is described in European Patent Specification 170,838.

Examples of halogenotriazine (4) are:
2,4,6-trichlorotriazines (cyanuric chloride)
2,4,6-trifluorotriazine
2,4,6-tribromotriazine Examples of amines of the formula (6) in which Z is $Z_1$ to $Z_5$ are as follows

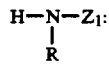

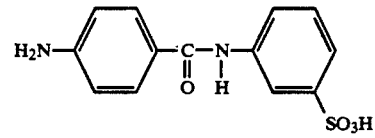

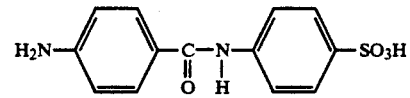

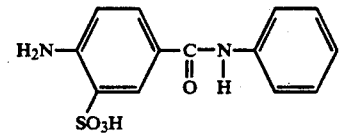

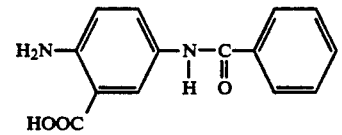

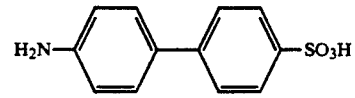

-continued
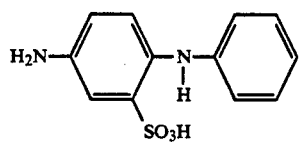
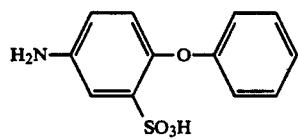
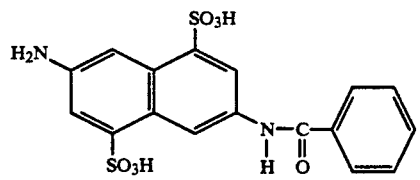
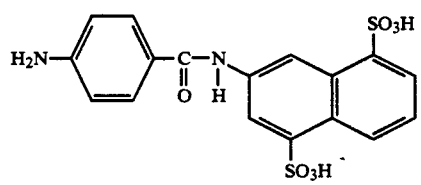
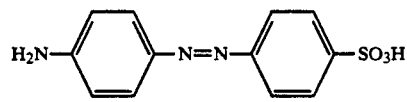
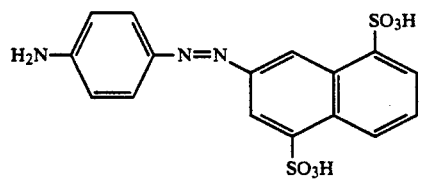
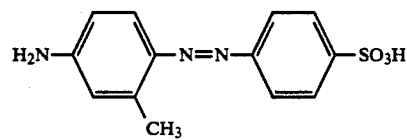
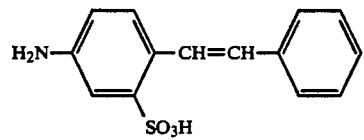
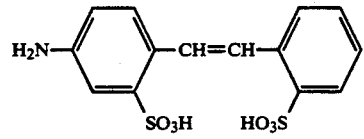
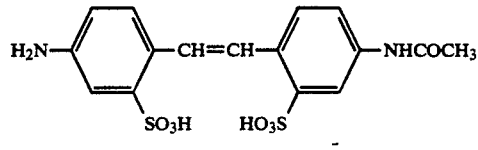

-continued
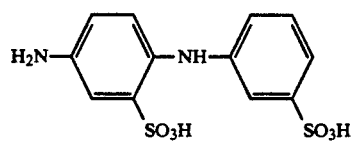
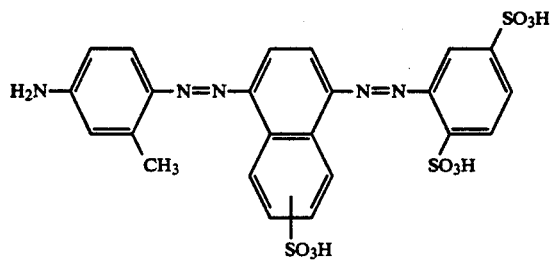
$H-N-Z_2$:
   |
   R
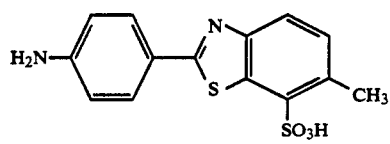
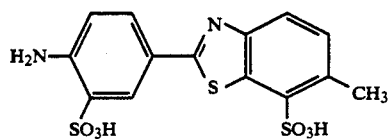
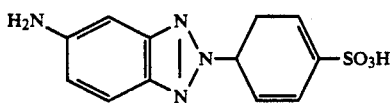
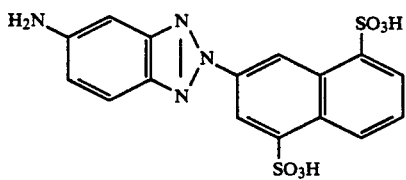
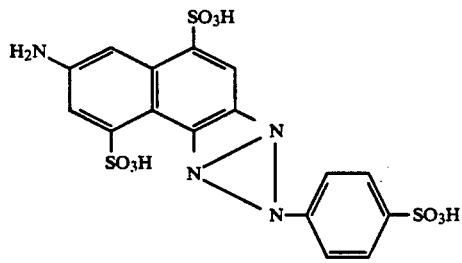
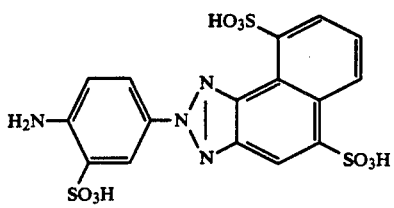

-continued
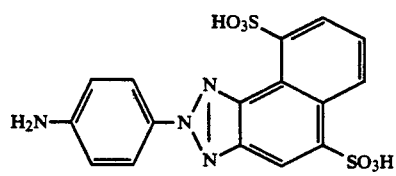
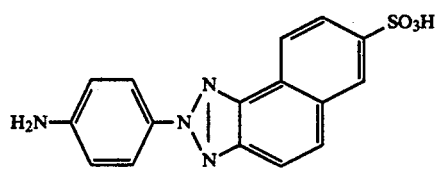
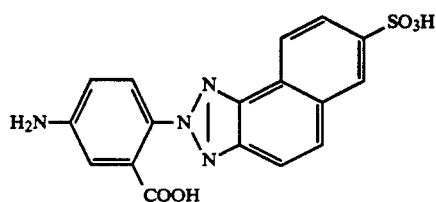
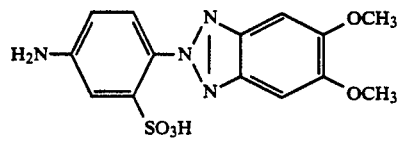
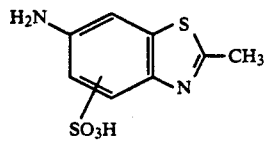
$$H-N-Z_3:$$
$$\phantom{H-N-}R$$
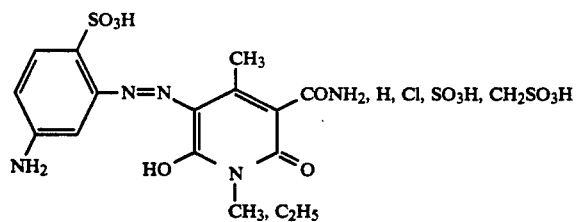
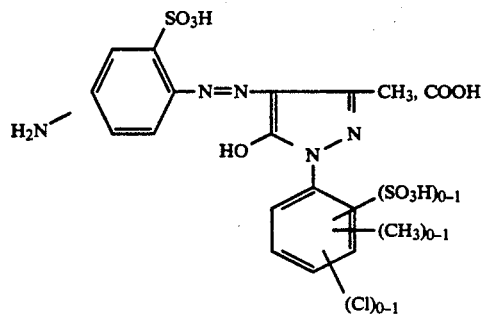

-continued
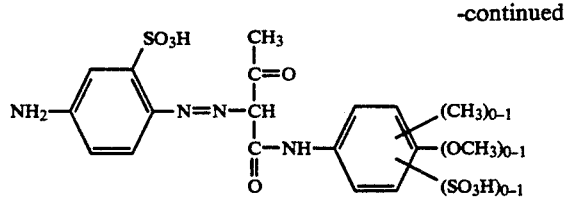
H—N—Z₄:
|
R
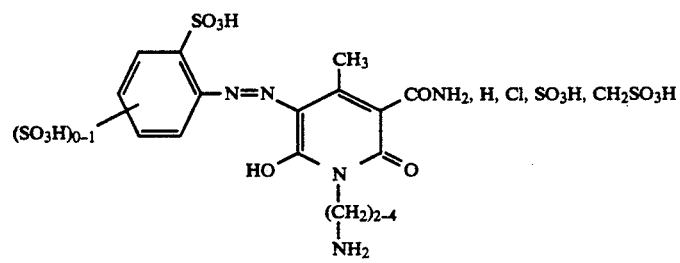
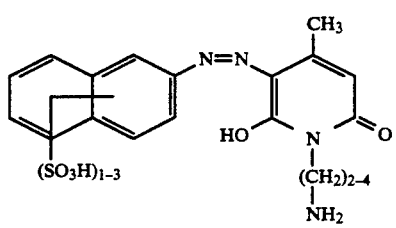
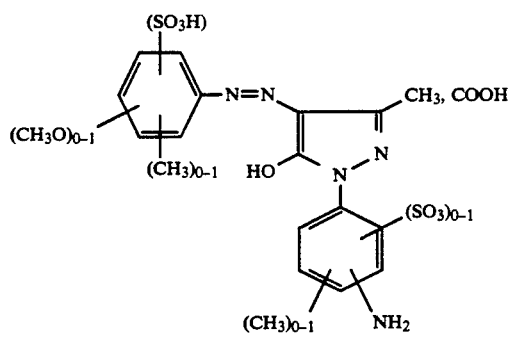
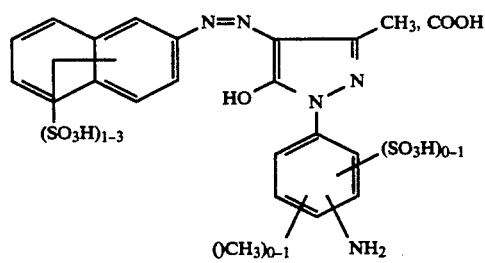
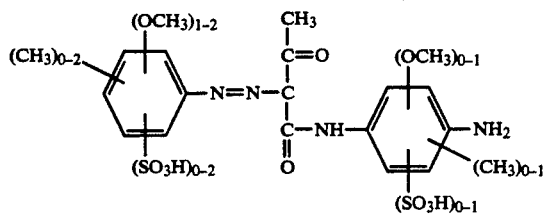
H—N—Z₅:
|
R -continued

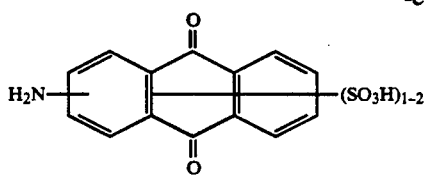

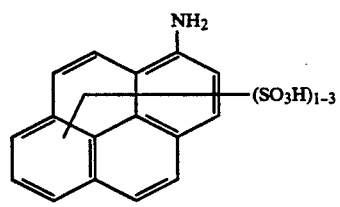

The dyestuffs are isolated, for example, by the addition of salt and dried. However, it is also possible to pass the condensation solutions or suspensions through a drum or spray drier.

Just as well, it is possible to prepare concentrated aqueous solutions from the moist pastes of the dyestuffs, for example by subjecting suspensions or solutions of these dyestuffs in water to desalting, for example by pressure permeation.

The dyestuffs dye cellulose-containing materials, in particular paper, cotton and viscose and leather in blue shades having good wet and lightfastness properties.

The dyestuffs can be used in all processes customary in the paper and textile industry for substantive dyestuffs, in particular in the pulp as well as surface dyeing of paper for sized and unsized grades, starting from bleached or unbleached cellulose of different provenance, such as softwood or hardwood sulphite and/or sulphate cellulose. They can also be used in the yarn or piece dyeing of cotton, viscose and linen by the exhaust method from long liquor or in continuous processes.

The paper dyeings obtained with the dyestuffs according to the invention are distinguished by good light and wet fastness (bleeding fastness). The brilliance and clarity of the shades may also be mentioned. Furthermore, their compatibility with suitable dyestuffs is very good.

The dyestuffs according to the invention are also suitable as acid dyestuffs for the dyeing of wool, silk and synthetic polyamides. They can also be used in all dyeing processes customary for reactive dyestuffs.

The formulae of the water-soluble dyestuffs in the description and in the examples are those of the free acids. The dyestuffs are in general isolated and applied in the form of their alkali metal salts, in particular the lithium salts, sodium salts or potassium salts.

The colour numbers given in the examples refer to the Colour Index Hue Indication Chart (Indicator Numbers).

The formulae given in the examples below each refer to one of the isomeric reaction products formed in the reaction, reference being made to what has been said under formula (1) with respect of the substituents in the two outer aromatic rings of the triphendioxazine system of the isomeric reaction products.

EXAMPLE 1

0.1 mol of 2,9-diamino-6,13-dichloro-triphendioxazine disulphonic acid (obtained according to Example 1 of European Patent Specification 170,838) were stirred in 1.5 l of water and neutralised with lithium hydroxide, as a result of which the dyestuff went into solution. 500 g of ice were then added, 0.1 mol of cyanuric chloride was sprinkled in, and the mixture was stirred at 0° C. to 5° C. until only traces of the starting material were left (checked by thin-layer chromatography). During the acylation, the pH was maintained between 6 and 7 by dropwise addition of lithium hydroxide solution. 0.1 mol of 4-amino-N-(4'-sulphophenyl)-benzamide was then added, the mixture was heated to 50° C. to 60° C. and the pH was maintained at 4.5 to 5.5 by dropwise addition of lithium hydroxide solution. After condensation was complete, the dyestuff was precipitated by adding 4% by volume of sodium chloride. The product was filtered off with suction, dried and milled to give a dyestuff powder soluble in water with a clear blue colour which dyes cotton in clear blue shades (colour number 13) by a dyeing process customary for substantive dyestuffs.

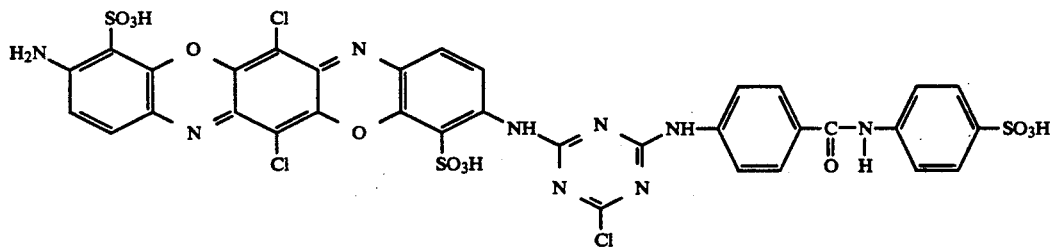

Further valuable direct dyestuffs for cotton which produce clear blue shades (colour number 13) are obtained analogously to the details given in Example 1 by using an equivalent amount of the amines listed below instead of the amine 4-amino-N-(4'-sulphophenyl)-benzamide used there.

EXAMPLE
2
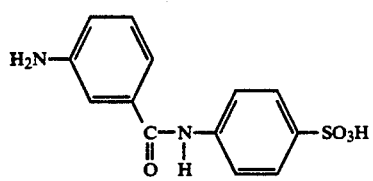
3
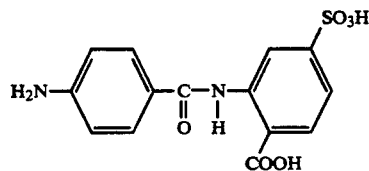
4
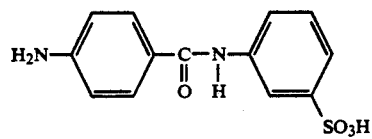
5
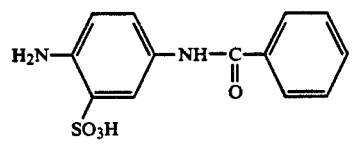
6
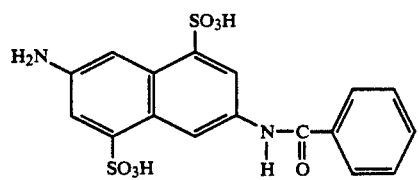
7
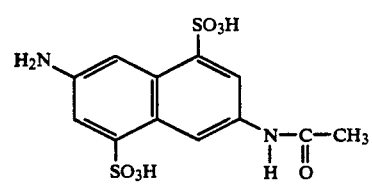
8
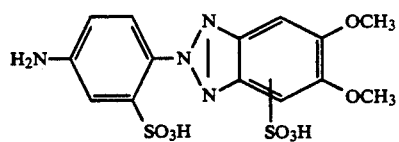
9
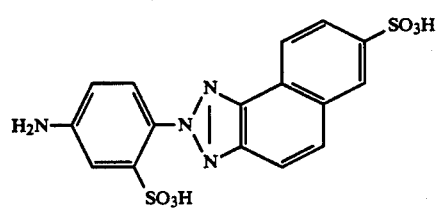
10
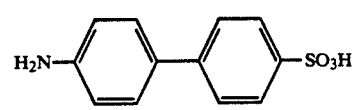
-continued
11
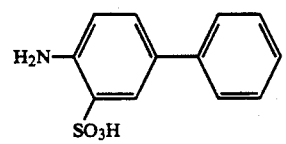
12
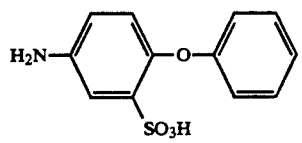
13
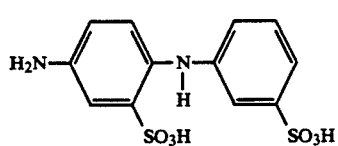
14
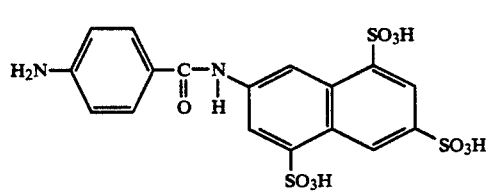
15
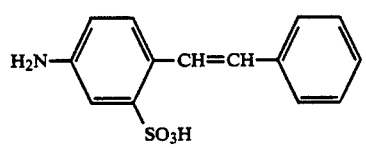
16
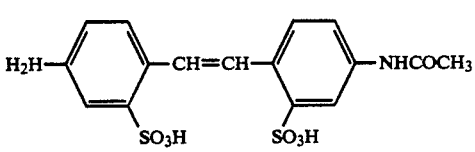
17
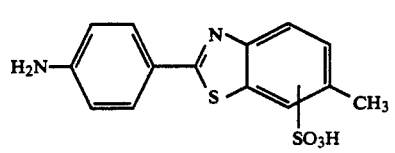
18
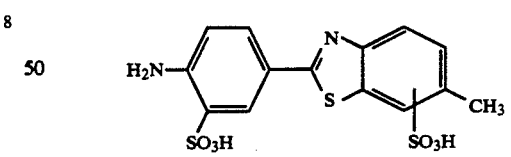
19
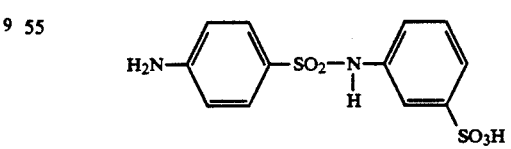
20
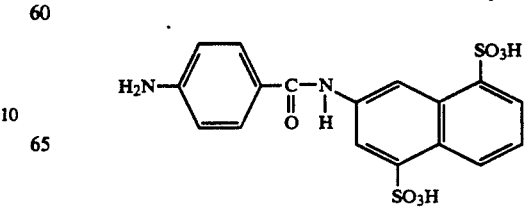

-continued
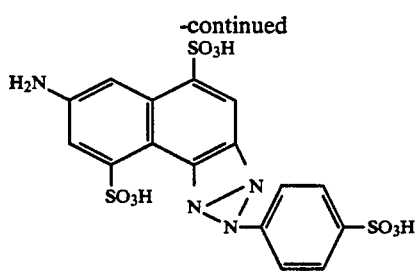
The procedure of Example 1 is repeated, using the azodyestuffs listed below for the exchange of the second chlorine atom, to give dyestuffs for cotton which produce greenish blue to green shade.
| Example | | Shade on cotton | Colour number |
|---|---|---|---|
| 22 | [structure] | blue-green | 16 |
| 23 | [structure] | blue-green | 16 |
| 24 | [structure] | green | 17 |
| 25 | [structure] | green | 17 |
| 26 | [structure] | green | 17 |
| 27 | [structure] | green | 17 |

| | Shade on | Colour |
| Example | cotton | number |
| --- | --- | --- |
| 28 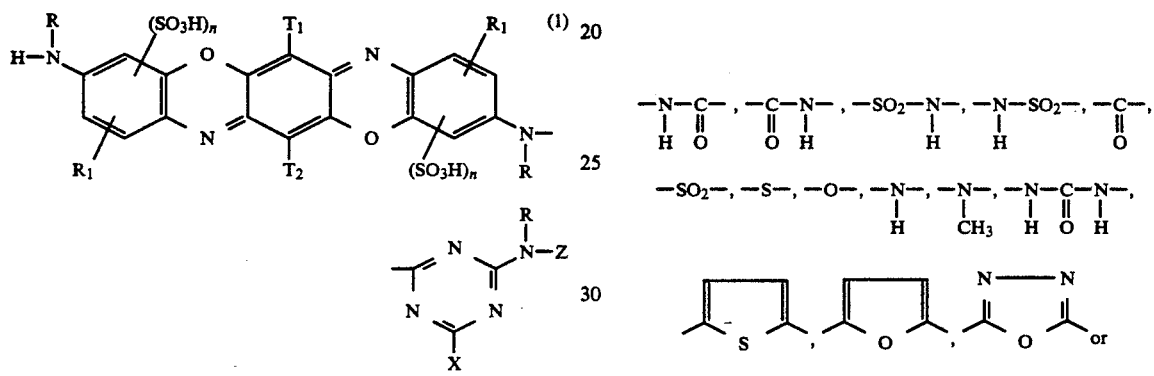 | greenish blue | 15 |

I claim:
1. Triphendioxazine dyestuffs of the formula

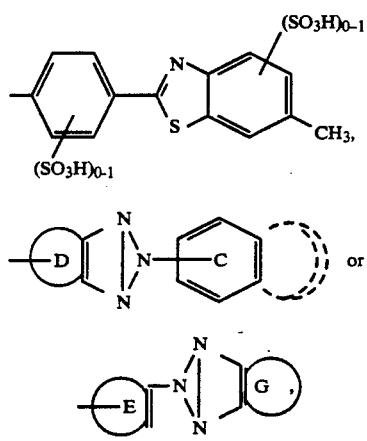

in which
R represents hydrogen or unsubstituted $C_1$-$C_6$-alkyl,
$R_1$ represents hydrogen, halogen, unsubstituted $C_1$-$C_4$-alkyl, unsubstituted $C_1$-$C_4$-alkoxy or —COOH,
$T_1$ and $T_2$ each represent hydrogen, chlorine, bromine, unsubstituted $C_1$-$C_4$-alkyl, or $C_1$-$C_4$-alkyl which is substituted by —$SO_3H$, unsubstituted $C_1$-$C_4$-alkoxy, or $C_1$-$C_4$-alkoxy which is substituted by $C_1$-$C_4$-alkyl or —$SO_3H$, or unsubstituted phenyl, unsubstituted phenoxy, or substituted phenyl or substituted phenoxy which in each case is substituted by chlorine, bromine, $C_1$-$C_4$-alkyl or —$SO_3H$,
X represents fluorine, chlorine, bromine, sulpho, methylsulphonyl, ethylsulphonyl or pyridyl which is unsubstituted or substituted by sulpho, carboxyl, sulphamoyl or carbamoyl,
Z represents $Z_1$, $Z_2$ or $Z_5$, in which
$Z_1$ represents the grouping

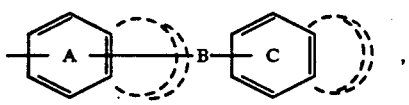

in which
A represents a substituted or unsubstituted phenylene or naphthalene radical, and
C represents a substituted or unsubstituted phenyl- or naphthyl radical,
and
B represents a direct bond or a bridging member of the formula $$-N-C-, -C-N-, -SO_2-N-, -N-SO_2-, -C-,$$
$$\phantom{-N-}H\phantom{-}O\phantom{---}O\phantom{-}H\phantom{------}H\phantom{------}H\phantom{------}O$$

$$-SO_2-, -S-, -O-, -N-, -N-, -N-C-N-,$$
$$\phantom{-SO_2-, -S-, -O-,}H\phantom{--}CH_3\phantom{--}H\phantom{-}O\phantom{-}H$$

[heterocyclic bridging groups with S, O, and N—N containing rings] or

—CH=CH—, $Z_2$ represents a radical of the formula

[benzothiazole structure with $(SO_3H)_{0-1}$ and $CH_3$ substituents]

[azo linked D—C and E—G structures with N=N groups] or in which
C has the abovementioned meaning,
D and E each represent the radical of a substituted or unsubstituted phenylene or naphthalene ring, and
G represents the radical of a substituted or unsubstituted benzene or naphthalene ring;
$Z_5$ represents

in which
L represents a radical of the formula:

23

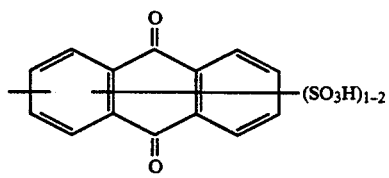

or

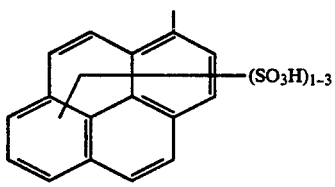

n represents 0 or 1, with the proviso that, if

24 n is 1, the sulpho groups are in each case in the orthoposition relative to the substituents

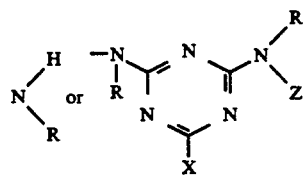

and the substituents for the rings A, C, D, E, G, L are selected from the group consisting of fluorine, chlorine, or bromine, $C_1$–$C_4$-alkyl, $C_1$–$C_4$-alkoxy, nitro, sulpho, carboxyl hydroxyl, $C_1$–$C_4$-alkylcarbonylamino, unsubstituted or chlorine-, methoxy-, methyl-substituted phenylcarbonylamino, phenylureido, ureido, and Ring C can also be substituted by phenyl and naphthylazo groups.

* * * * *

UNITED STATES PATENT AND TRADEMARK OFFICE
CERTIFICATE OF CORRECTION

Page 1 of 3

PATENT NO : 5,202,436
DATED : April 13, 1993
INVENTOR(S): Jager, Horst

It is certified that error appears in the above-identified patent and that said Letters Patent are hereby corrected as shown below:

Col. 1, line 45   Delete " 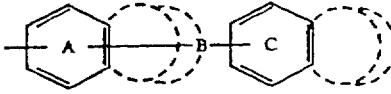 " and substitute -- 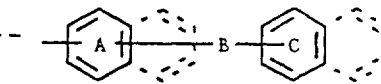 --

Col. 2, line 12   Delete " 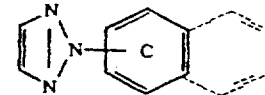 " and substitute -- 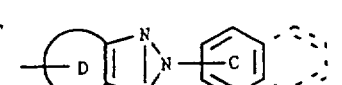 --

Col. 2, line 18   Delete " 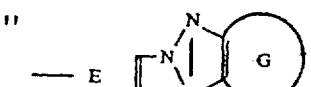 " and substitute

-- 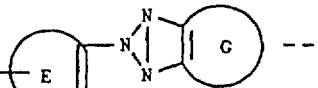 --

Col. 2, line 33   Delete " 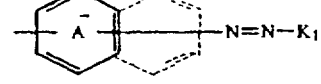 " and substitute

-- 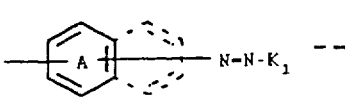 --

UNITED STATES PATENT AND TRADEMARK OFFICE
CERTIFICATE OF CORRECTION

PATENT NO : 5,202,436
DATED : April 13, 1993
INVENTOR(S): Jager, Horst

It is certified that error appears in the above-identified patent and that said Letters Patent are hereby corrected as shown below:

Col. 2, line 51        Delete " $K_2$ represents " and substitute -- $K_2$ represents --

Col. 11, last line     Delete " 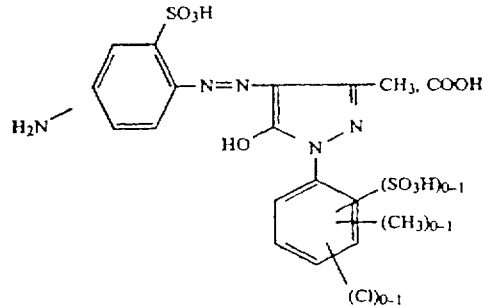 "

and substitute --
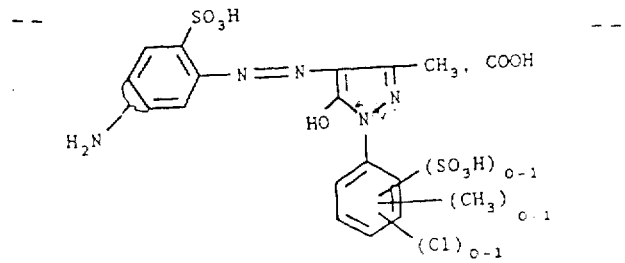
--

Col. 13, line 6        Delete " 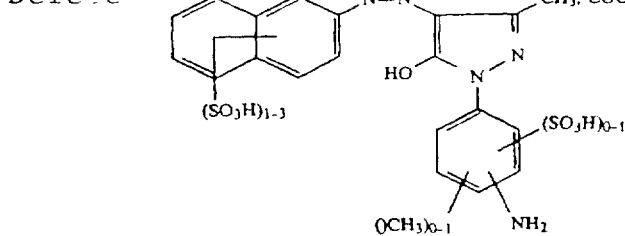 " and

UNITED STATES PATENT AND TRADEMARK OFFICE
CERTIFICATE OF CORRECTION

PATENT NO : 5,202,436
DATED : April 13, 1993
INVENTOR(S): Jager, Horst

It is certified that error appears in the above-identified patent and that said Letters Patent are hereby corrected as shown below:

Col. 13, line 6 Cont'd    substitute -- 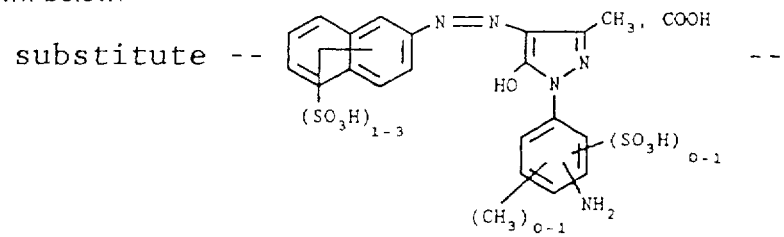 --

Col. 21, line 57    Delete " 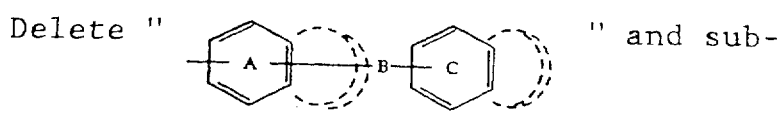 " and substitute -- 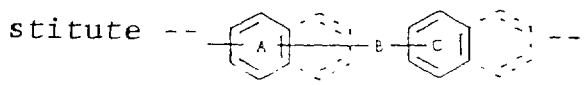 --

Col. 22, line 48    Delete " 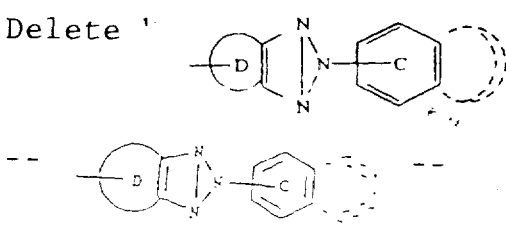 " and substitute -- 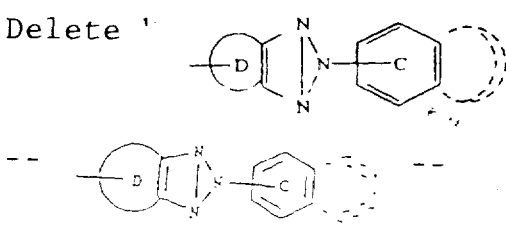 --

Signed and Sealed this

Fourteenth Day of March, 2000

Attest:

Q. TODD DICKINSON

Attesting Officer    Commissioner of Patents and Trademarks